(12) United States Patent
Guy

(10) Patent No.: US 6,851,844 B2
(45) Date of Patent: Feb. 8, 2005

(54) FIBER OPTIC FABRIC WITH OPAQUE COATING FOR DIRECTIONAL LIGHT EMISSION

(75) Inventor: James K. Guy, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 60 days.

(21) Appl. No.: 10/226,503

(22) Filed: Aug. 23, 2002

(65) Prior Publication Data
US 2004/0037091 A1 Feb. 26, 2004

(51) Int. Cl.⁷ .............................................. D03D 15/02
(52) U.S. Cl. ..................... 362/556; 362/570; 385/120; 442/200
(58) Field of Search ........................ 362/31, 551, 554, 362/556, 559, 565, 570, 577, 582, 103–108; 385/115, 120, 123, 128, 129, 130; 442/181, 199, 200, 202, 286–294; 139/383 R, 420 A, 420 C, 420 R

(56) References Cited

U.S. PATENT DOCUMENTS

| 3,508,589 | A | * | 4/1970 | Drieck et al. ........... 139/420 R |
| 3,781,537 | A | * | 12/1973 | Ramsey ...................... 362/559 |
| 4,234,907 | A | * | 11/1980 | Daniel ........................ 362/556 |
| 4,422,719 | A | | 12/1983 | Orcutt |
| 4,761,047 | A | * | 8/1988 | Mori .......................... 362/570 |
| 4,807,095 | A | * | 2/1989 | Bell ........................... 362/565 |
| 4,885,663 | A | * | 12/1989 | Parker ........................ 362/561 |
| 5,005,108 | A | * | 4/1991 | Pristash et al. .............. 362/31 |
| 5,249,105 | A | * | 9/1993 | Koizumi ...................... 362/31 |
| 5,709,448 | A | * | 1/1998 | Jennings et al. ............ 362/581 |
| 6,409,402 | B2 | * | 6/2002 | Tani et al. .................... 401/96 |
| 6,628,885 | B1 | * | 9/2003 | Wilkie et al. ............... 385/147 |

* cited by examiner

Primary Examiner—John Anthony Ward
Assistant Examiner—Ismael Negron
(74) Attorney, Agent, or Firm—Shimokaji & Associates, P.C.

(57) ABSTRACT

A fiber optic fabric includes woven optical fibers, an opaque coating on the fibers and openings on the high points of the weave. The opaque coating prevents light leakage from the fibers and the openings allow light to be emitted from the fabric in a directed manner. The fabric is capable of emitting light at an angle relative to the surface of the fabric such that the light is not visible from every viewpoint.

36 Claims, 9 Drawing Sheets

FIBER OPTIC FABRIC WITH OPAQUE COATING FOR DIRECTIONAL LIGHT EMISSION

BACKGROUND OF THE INVENTION

The present invention generally relates to fiber optic materials and methods for producing same. More specifically, this invention relates to fiber optic fabric incorporating woven optical fibers.

Optical fibers have been used in many devices and materials. These fibers may comprise a core and a cladding material. The core may comprise glass or plastic resin. The cladding material may include glass, plastic or air. The cladding material may have a lower refractive index than the core material. The efficiency of light propagation through the fiber may be a function of the difference in refractive index between the core and the cladding.

Light may be introduced at one end of an optical fiber. As the light travels through the fiber, a portion of the light may escape or leak through the sides of the fiber before reaching the end of the fiber. This leakage may be due to light rays exceeding the critical angle for internal reflection. This critical angle may be different for different points along the fiber. Bends in the fiber and scratches on the fiber surface may increase the light leakage at those points.

Using fibers having a core with a substantially higher index of refraction than the cladding may reduce the leakage. The addition of an annular layer of air between the core and the cladding has been described as further reducing the lateral diffusion. By using this type of fiber, lateral diffusion may be minimized.

Some fiber optic applications, however, require light being emitted along the sides of the fiber. The fibers described in U.S. Pat. No. 4,422,719 allow for lateral light emission. These fibers have a clear resinous core and a tightly fitted sleeve. The sleeve is designed to laterally emit a substantial component of light causing the sleeve to have a bright appearance. The entire length of the fiber appears to glow and the fiber is described as useful as a primary light source. Unfortunately, these fibers do not allow for both lit and unlit areas along the fiber. Additionally, they are inefficient at directional lighting.

Others have described ribbons formed by arranging the fibers in a planar, parallel array. One side of the ribbon is roughened by hot stamping with emery paper to form a series of interruptions in the cladding of each fiber. The roughened surface of the ribbon may appear lit when viewed from any angle, while the other side may appear unlit. Unfortunately, it may not be desirable for light to be emitted from the entire surface of the ribbon. Also, the hot stamping may structurally weaken the fibers. Additionally, increased directional lighting control is needed.

Fibers have been bent at selected locations along their length. Although, these fibers may allow for some areas along the fiber to be lit and others unlit, the bending may cause fiber breakage. Additionally, there may be light leakage from the unbent sections of the fiber. Further, this material depends on the transmitted light exceeding the critical angle for internal reflection at the bends. Because light is emitted from these fibers in all directions at the bends, directional control of the light emission is inefficient.

Fibers with luminaires and fibers with notches have been used to emit light in some manner directionally from the side of the fiber. Fibers with luminaires require the termination of a fiber at the luminaire thus creating the need for large numbers of fibers to feed an array of emission points. Also, the use of luminaries may have an adverse effect on aerodynamics, such as when the luminaires are attached to the outer mold line (OML) of an aircraft. Notched fibers may laterally emit light, but the notches may weaken the fibers. The notch creates a stress concentration that may fracture the fiber under minor loading. Some notched fibers have received additional processing. Notched fibers have been reflectively coated on one surface of the notch so that the light is reflected in a direction substantially perpendicular to the fiber. Although these processed notched fibers may allow for some light emission control, further increases in directional control are needed.

Woven and non-woven optical materials comprising these fibers have been described. A light emitting fabric comprising optical fibers woven into a cloth is disclosed in U.S. Pat. No. 4,234,907. Optical fibers may not be totally efficient at transmitting light and some light may leak into the cladding and produce a glow along the length of the fiber. These fabrics may comprise a combination of optical and non-optical fibers and may be uniformly illuminated. In such a fabric, the optical fibers may be visible when the fabric is unlit. Unfortunately, concealment of the optical fibers when unlit may be desired in some applications. Additionally, a fabric having uniform light emission may not be efficient when directional light emission is desired.

As can be seen there is a need for improved fiber optic materials. Specifically, an improved fiber optic fabric is needed, wherein there is increased directional control of the light emission from the fibers. Also needed is a fiber optic fabric having decreased light leakage and increased fiber strength. Further, a fiber optic fabric having increased directional emission control without the use of luminaries is needed. Additionally, a fiber optic fabric is needed, wherein the optical and non-optical fibers appear less distinctive when the fabric is unlit.

SUMMARY OF THE INVENTION

In one aspect of the present invention, an article of manufacture for emitting a light comprises a plurality of optical fibers such that a woven fabric is formed; an opaque coating in contact with the optical fibers; and a plurality of openings in the coating, wherein the fabric is capable of providing a directional light emission.

In another aspect of the present invention, a woven fabric for emitting a light comprises a plurality of optical fibers; a plurality of non-optical fibers in contact with the optical fibers; an opaque coating in contact with the optical fibers; and a plurality of openings in the opaque coating, such that the fabric is capable of providing a directional light emission.

In yet another aspect of the present invention, an article of manufacture for illuminating an aircraft comprises a plurality of optical fibers such that a woven fabric is formed; an opaque coating in contact with the optical fibers; and a plurality of openings in the coating, wherein the article is capable of providing a directional light emission.

In a still further aspect of the present invention, an article of manufacture for emitting a light comprises a plurality of optical fibers; a plurality of non-optical fibers formed of a material including but not limited to fiberglass, Kevlar, carbon, and cotton, the non-optical fibers in contact with the optical fibers such that a woven fabric is formed; an opaque coating in contact with the woven fabric, the opaque coating formed from a material including but not limited to epoxy, latex, Teflon and a combination thereof; and a plurality of openings in the opaque coating, the openings positioned at the high points of the weave of the woven fabric, wherein the article is capable of providing a directional light emission.

In another aspect of the present invention, a method for producing an article of manufacture for emitting a light comprises the steps of providing a plurality of optical fibers such that a woven fabric is formed; applying an opaque coating in contact with the optical fibers; and removing a portion of the opaque coating such that a plurality of openings are formed, wherein the article is capable of providing a directional light emission.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides fiber optic fabrics capable of directional light emission and methods for producing same. The fabrics of the present invention may find beneficial use in many industries including apparel, textiles, home lighting, aircraft manufacturing, electronics, safety, aviation, and transportation. The fabrics of the present invention may find use in flight deck displays, interior and exterior lighting, safety and novelty clothing, aircraft position and anti-collision lighting, floor coverings, architectural panels, and others.

The fabrics of the present invention can comprise woven optical and non-optical fibers. An opaque coating may be applied to the optical fibers alone or both the optical and non-optical fibers. The opaque coating may have openings through which light may be emitted. Unlike the prior art, the fabric may be capable of emitting light in a specific solid angle relative to the plane of the fabric.

Figure 1:
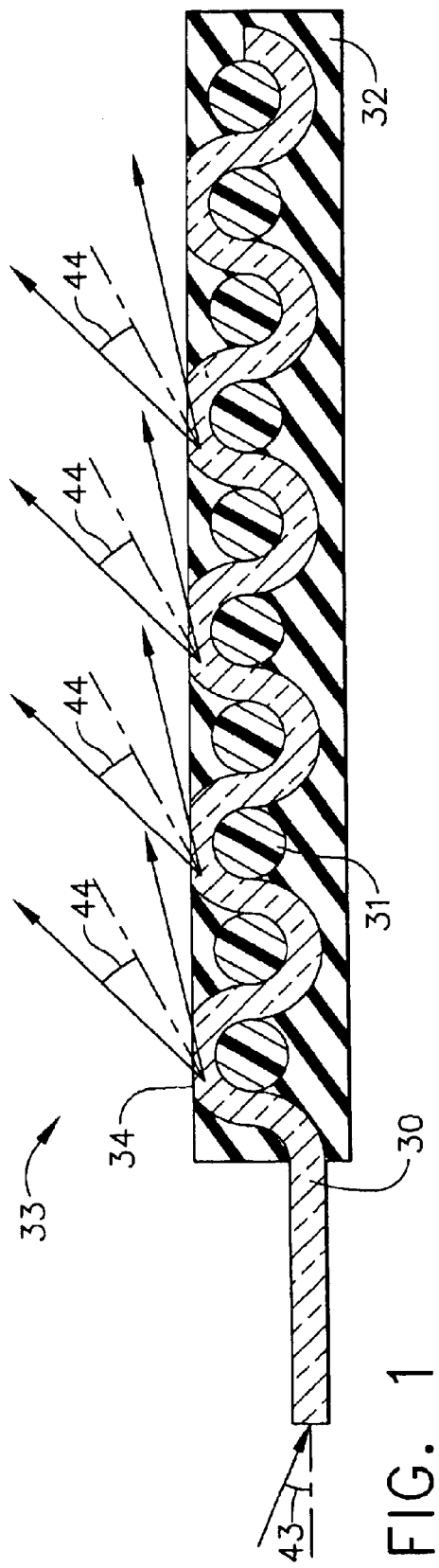
FIG. 1 is a cross sectional diagram of a fiber optic fabric according to an embodiment of the present invention.

In FIG. 1, a cross sectional diagram of a fiber optic fabric 33, according to an embodiment of the present invention is depicted. In this figure, the optical fiber 30 is woven through the non-optical fibers 31. The opaque coating 32, which covers the optical fiber 30 and non-optical fibers 31, has a plurality of openings 34 positioned at the high points of the weave. The high points of he weave are the areas on the surface of the fabric 33 furthest from the center plane of the fabric. Unlike the prior art, when light passes through the optical fibers 30 of the fabric 33, a portion of the light may be emitted through the openings 34 in the opaque coating 32. The light emitted through the openings 34 may be directed In a specific region, or solid angle, which may not be visible from any other angle. This is also unlike the prior art. The exit angle 44 at which light is emitted through the openings 34 may be a function of the acceptance angle 43 of the optical fiber 30. The exit angle 44 of the emitted light may be about equivalent to the acceptance angle 43 of the optical fiber 30. The solid angle in which light is emitted may also be a function of the weave of the fabric and the dimensions of the openings 34.

Light may enter the end of the optical fiber 30 and travel through the optical fiber 30 by internal reflection. When light reaches an opening 34 in the coating 32, it may be emitted from the optical fiber 30. This emission may be in the direction that the light was traveling when it reached the opening 34. Because the openings 34 may be the only areas through which the light may be emitted from the optical fiber 30, the direction of the emitted light may be limited. The fabrics 33 of the present invention may be capable of providing a directional light emission. As defined herein, a directional light emission is a light emission from a fabric 33 that may not be seen equally from all angles relative to the fabric 33. For example, a directional light emission may be easily visible from an elevation of about 10° relative to the plane of the fabric 33 and may not be easily visible from a 90° elevation.

Figure 2:
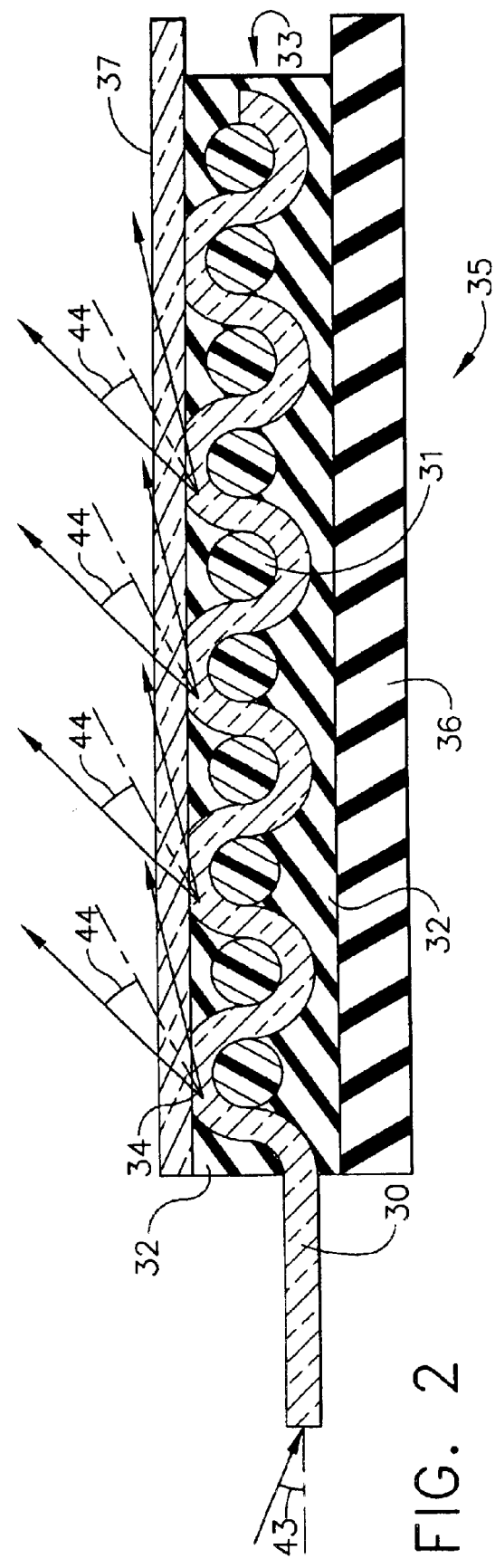
FIG. 2 is a cross sectional diagram of an embedded fiber optic fabric according to an embodiment of the present invention.

In FIG. 2, a cross sectional diagram of an embedded fiber optic fabric 35 according to an embodiment of the present invention is depicted. In this figure, the fiber optic fabric 33 is adhered between a sub-structure 36 and a cover material 37. The cover material 37 may be a transparent wash coat or an index matched composite material. The cover material 37 may improve the strength or other properties of the embedded fiber optic fabric 35 and may cover the openings 34. The cover material 37 may also alter the color of the light emitted from the embedded fabric 35. The sub-structure 36 may be a structural panel for a variety of manufactured articles. The sub-structure 36 may comprise the same material as the article into which it is to be incorporated. Assembly time may be reduced for many products by using the present invention. For example, the fabric may be incorporated into structural panels, such as structural panels for aircraft. In this case, structural panels that incorporate the fabric of the present invention may replace conventional exterior lights. This may eliminate the manufacturing steps of mounting and wiring the exterior lights.

The fabric 33 of the present invention may comprise woven optical fibers 30. The fabric 33 may comprise optical fibers 30 and non-optical fibers 31. The optical fibers 30 if the present invention may comprise glass, plastic, or combination of both glass and plastic. Any fiber capable of light transmission may be useful in this invention. The non-optical fibers 31 of the present invention may comprise fiberglass, plastic, carbon, poly paraphenyleneterephthalamide sold under the trademark KEVLAR, cotton, nylon, polyester, or others. Any fiber capable of being woven into a fabric may be useful in the present invention. The non-optical fibers 31 may be capable of transmitting light, such as plastic fibers, and they are referred to herein as non-optical fibers because they may not be capable of emitting light from the fabric 33 of the present invention. The composition and characteristics of a useful non-optical fiber 31 may be dictated by variables which may include the desired use of the fabric, the composition of the coating, and the desired weave pattern. For example, if the fabric is to be used in the manufacturing of safety apparel, the preferred non-optical fibers 31 may include cotton. As another example, if a coating 32, such as epoxy, Is applied after the fabric has been woven, a useful non-optical fiber 31 may be a non-optical fiber matched in color to the epoxy or a non-optical fiber that will adhere to the epoxy. The non-optical fibers 31 may be structural fibers and they may match the composition of the structure to which the fabric is to be adhered. For example, poly paraphenyleneterephthalamide fibers may be used if the fabric is to be placed on the surface of a vehicle. Preferred non-optical fibers 31 may be comprised of materials including but not limited to fiberglass, poly paraphenyleneterephthalamide, carbon and cotton.

Figure 10:
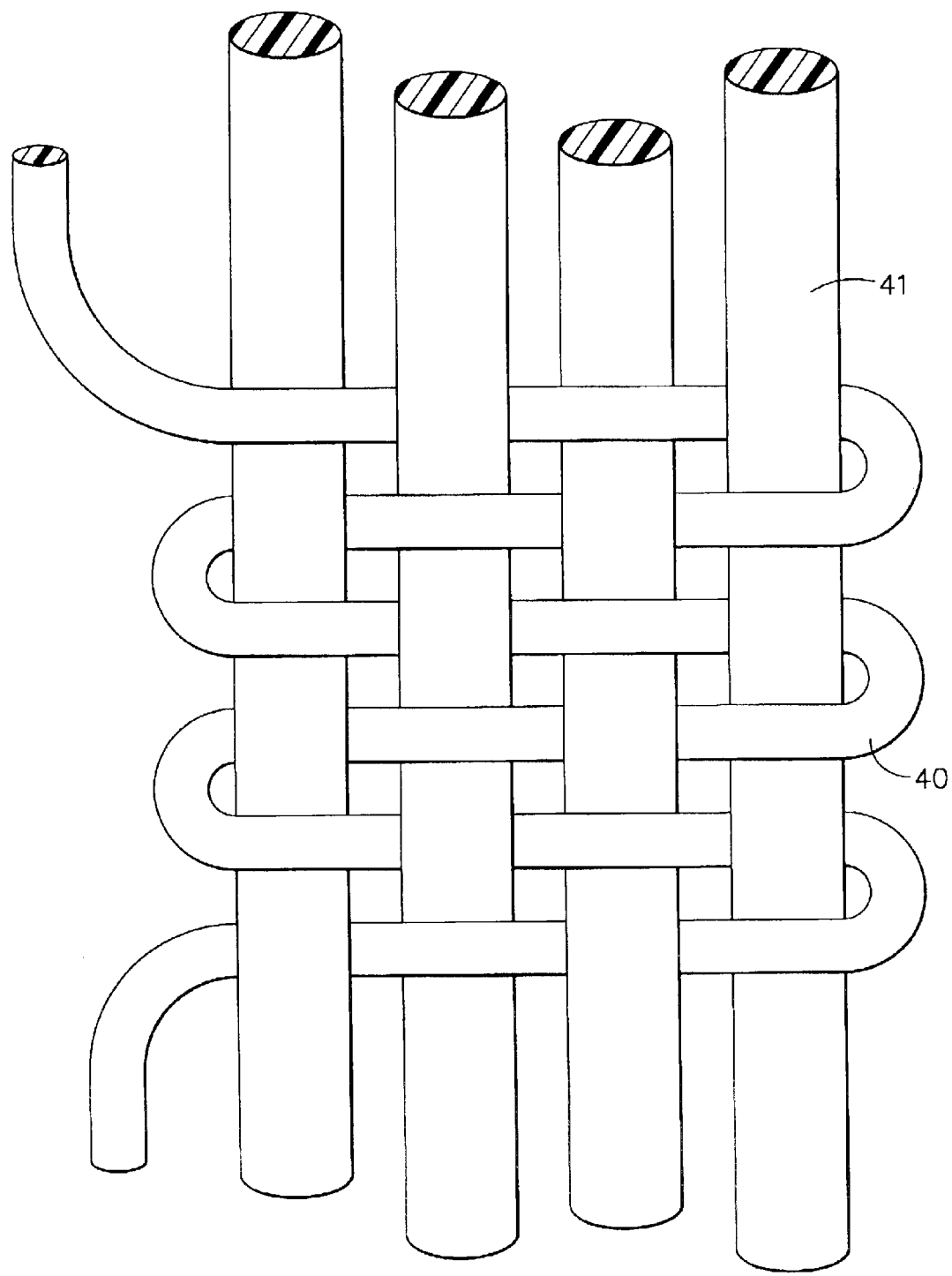
FIG. 10 is a schematic diagram of a weave.

Optical fibers 30 or both optical fibers 30 and non-optical fibers 31 may be woven into a fabric of the present invention. The fibers may be woven into a fabric by the methods described in U.S. Pat. No. 4,234,907, which is incorporated herein by reference. The optical fibers 30 may be woven in the weft direction, the warp direction, or both. Because a directional light emission may be in the direction that the light was traveling through the optical fiber 30 when it reached the opening 34, fabrics 33 comprising optical fibers 30 in both the weft and the warp direction may be useful. By definition, the weft threads 40 are the threads usually carried by the shuttle in weaving, whereas the warp threads 41 extend lengthwise in the loom, crossed by the weft threads 40, as seen in FIG. 10. Before or after the fibers are woven, a coating 32 may be applied to the optical fibers 30.

The coating 32 may be applied to the optical fibers 30 during or after the manufacture of the fiber. Methods for applying a coating 32 to an optical fiber 30 are known in the art. Useful methods may include extrusion, casting, reaction injection molding, painting, washing, spraying, and others. A useful method of applying the coating 32 may depend on variables including the composition of the optical fiber 30 and the composition of the coating 32. For example, if the optical fibers 30 comprise plastic and the coating 32 comprises epoxy, the painting method may be useful. A useful method may also depend on the timing of the coating application. For example, if the coating 32 is applied during the manufacturing of the fiber, the extrusion method may be useful. As another example, if the coating 32 is applied after the optical fibers 30 are woven into a fabric, the spraying method or Reaction Injection Molding may be useful.

The coating 32 of the present invention may be an opaque coating. The coating 32 may prevent light from passing therethrough. Light entering one end of an optical fiber 30 may pass out of the other end of the fiber after a portion of the light is lost. The lost portion of light may be light that has diffused through the cladding of the optical fiber 30. The lost light may result in the length of the optical fiber 30 having a glow. The portion of light that results in the glow is referred to herein as leakage. The opaque coating 32 may prevent the leakage and the resulting glow.

The composition and characteristics of a useful coating 32 may be dictated by variables hat may include the desired use of the fabric, the composition of the optical fibers 30, and the application method. Useful coatings 32 of the present invention may include epoxy, latex, fluoropolymer sold under the trademark TEFLON and acrylic. For example, if the coating is applied to optical fibers comprising plastic, a useful coating may be epoxy. The preferred coating 32 may depend on the composition of the optical fiber 30 and the timing of the coating application. For example, when using plastic optical fibers and applying the coating 32 after the fabric is woven, a preferred coating may comprise epoxy. As another example, when applying the coating by reaction injection molding during fiber manufacture, a preferred coating 32 may depend on the structure to which the fabric is to be adhered. A useful coating may be a coating 32 that aids in concealing the fibers. For example, if a fiber optic fabric 33 is to be used as safety stripes on purple apparel, a purple coating 32 may be useful. Preferred coatings 32 may include but are not limited to epoxy, latex, fluoropolymer, and a combination thereof.

The coating 32 may have openings 34 through which light may be emitted. The openings 34 may improve directional control of the light emission. Removing portions of the coating 32 from the woven fabric may produce the openings 34. The coating 34 may be removed from the high points of the weave by sanding, etching, polishing, machining, and other methods. The cladding of the optical fibers 30 may also be removed from the high points of the weave by these methods. The coating 34 and the cladding of the optical fiber 30 may be removed together, as by sanding. They may also be removed separately, as in a two-step process. Connecting the fabric to a suitable light pipe and light source may illuminate the fiber optic fabric.

Methods for illuminating a fiber optic fabric are known in the art and any illumination method may be useful. When light is transmitted through the fabric 33, portions of the light may be emitted through the openings 34. When the fabric 33 is lit, small discrete points of light may be emitted at each spot where the coating and cladding were removed. The discrete points of light may be distinguished, or resolved, while at a distance determined by the Rayleigh criterion. The Rayleigh criterion states that two point sources of monochromatic radiation with the same wavelength are just resolved if the position of the first minimum of one diffraction image coincides with the position of the central maximum of the other diffraction image. At distances farther than the distance determined by the Rayleigh criterion, it may not be possible to resolve the points of light, and the fabric 33 may appear uniformly illuminated. For apertures, such as the openings 34, the angular resolution may be a function of the size of the apertures and the angular resolution may aid in optical fiber 30 selection.

EXAMPLE 1

A fiber optic fabric was produced according to an embodiment of the present invention. A sample of Fibertex™ fabric was purchased from Lumitex, Inc., Strongsville, Ohio. A coating 32 comprised of black epoxy was applied to the fabric by painting. The coated fabric was then sanded. The sanding removed the coating 32 and the fiber cladding at the high points of the weave, producing the openings 34.

Figure 3:
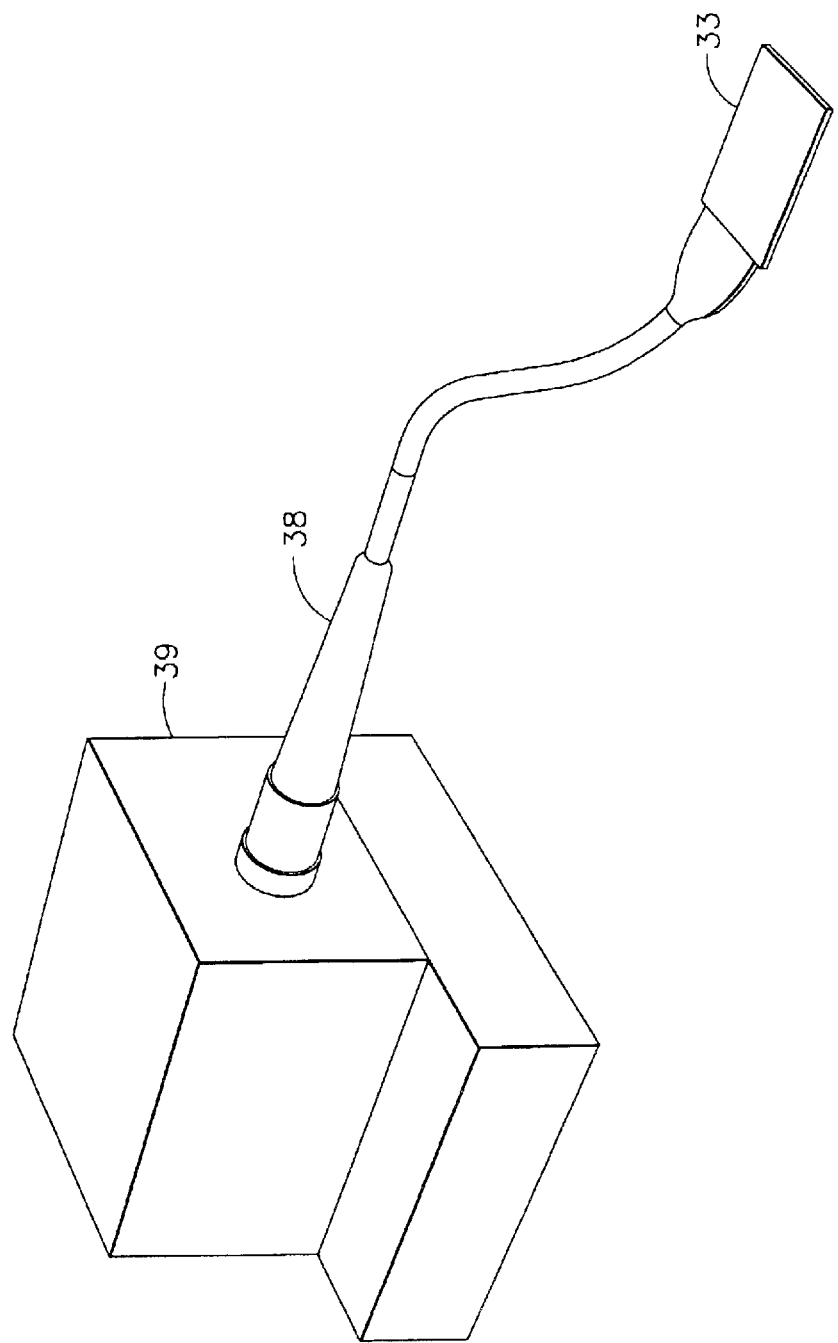
FIG. 3 is a photograph of a system for illuminating a fabric according to an embodiment of the present invention.
Figure 4:
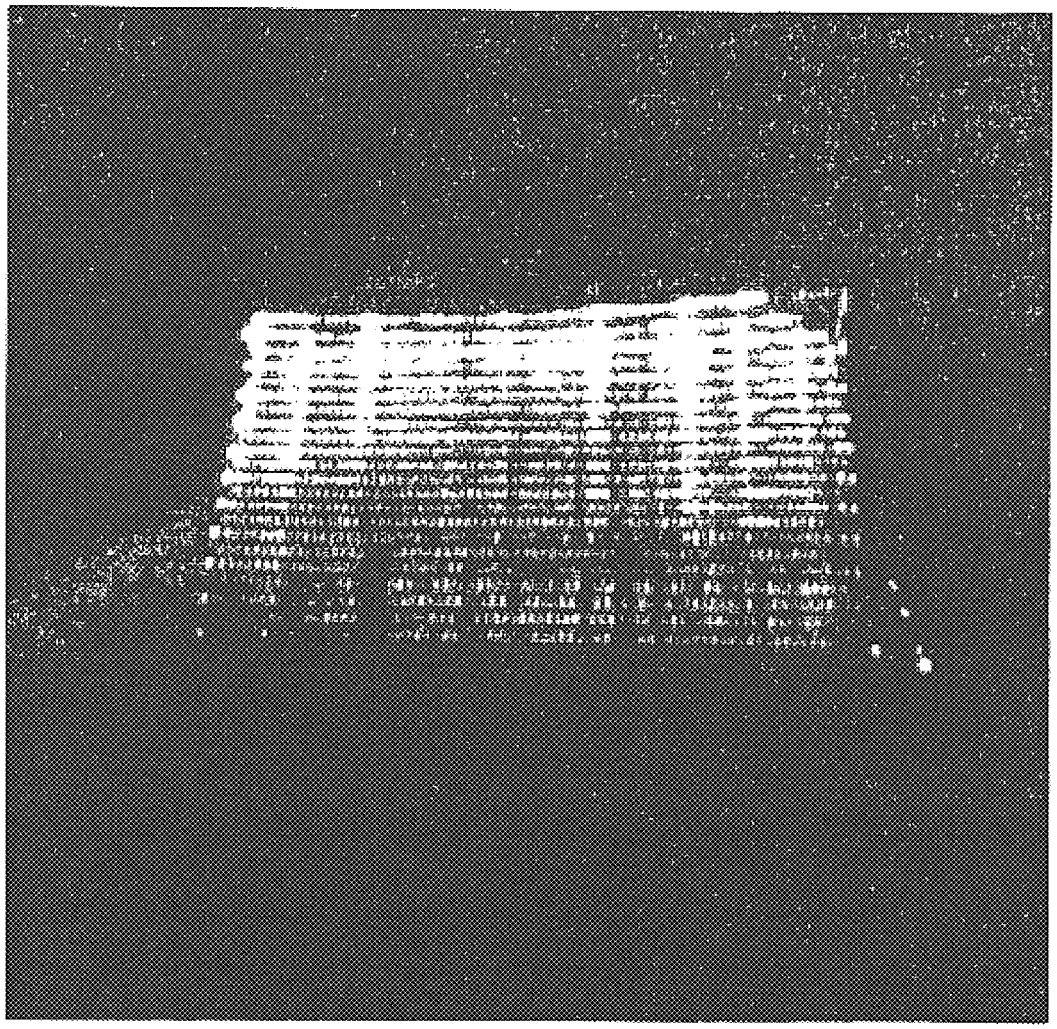
FIG. 4 is a photograph of a fabric at a 10° elevation according to an embodiment of the present invention.
Figure 5:
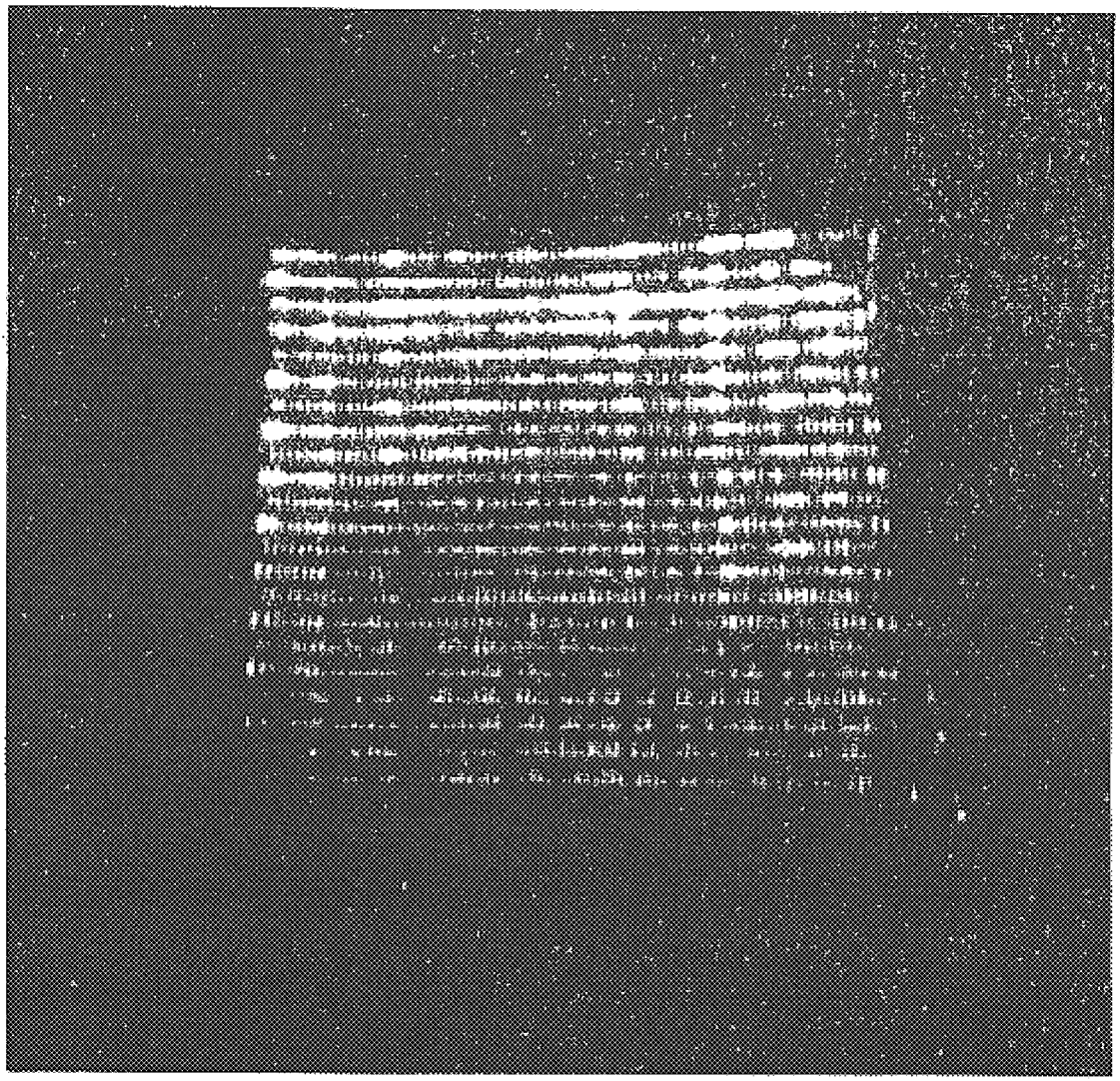
FIG. 5 is a photograph of a fabric at a 26° elevation according to an embodiment of the present invention.
Figure 6:
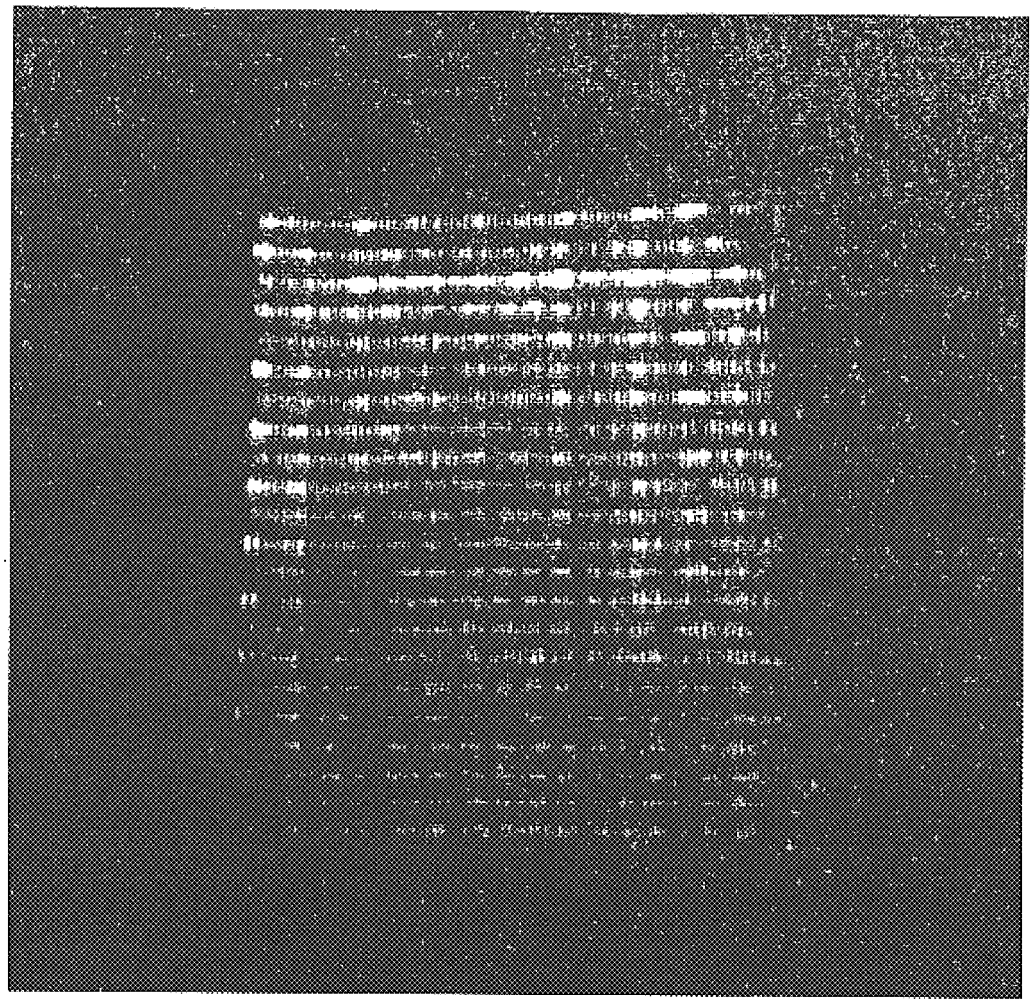
FIG. 6 is a photograph of a fabric at a 42° elevation according to an embodiment of the present invention.
Figure 7:
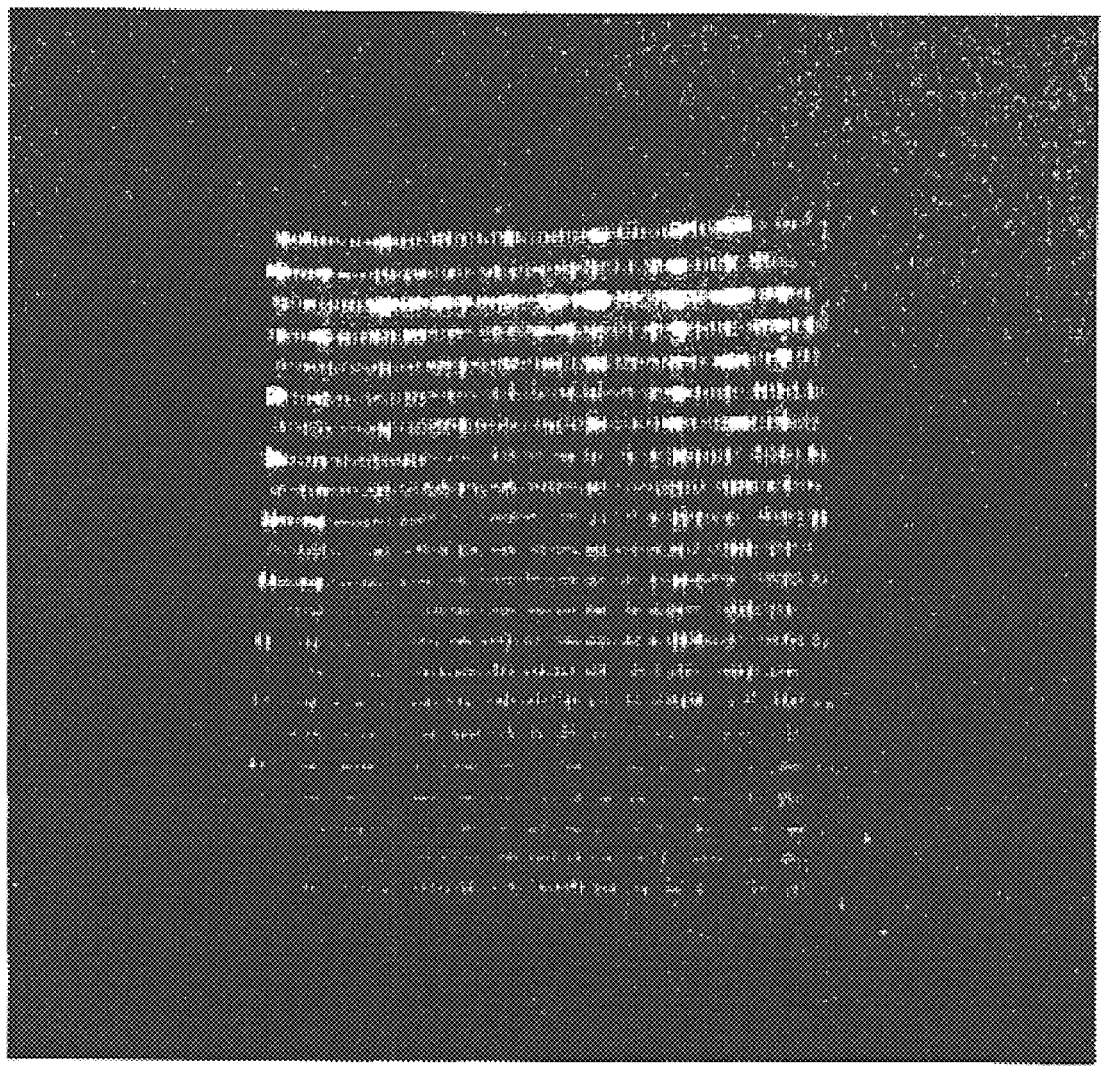
FIG. 7 is a photograph of a fabric at a 58° elevation according to an embodiment of the present invention.
Figure 8:
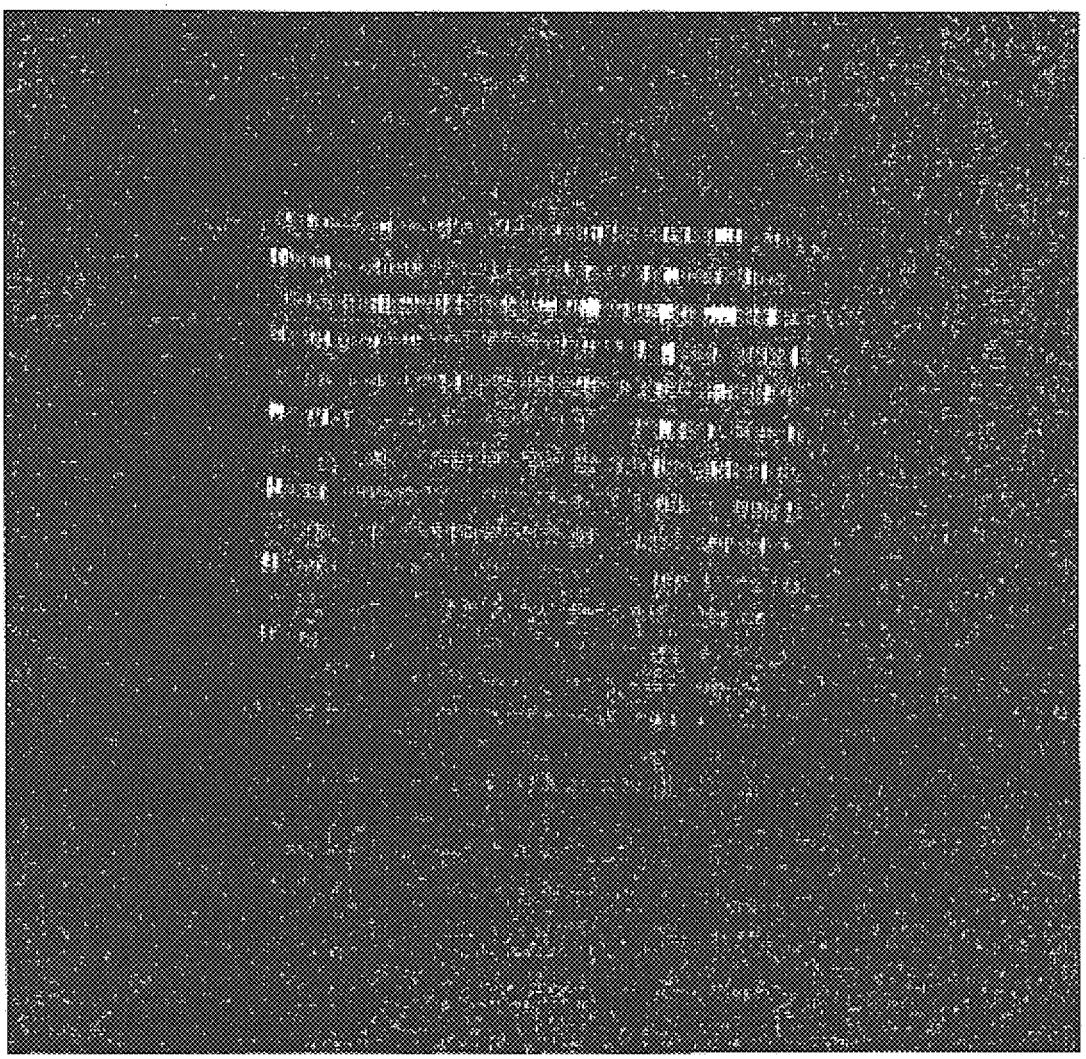
FIG. 8 is a photograph of a fabric at a 74° elevation according to an embodiment of the present invention.
Figure 9:
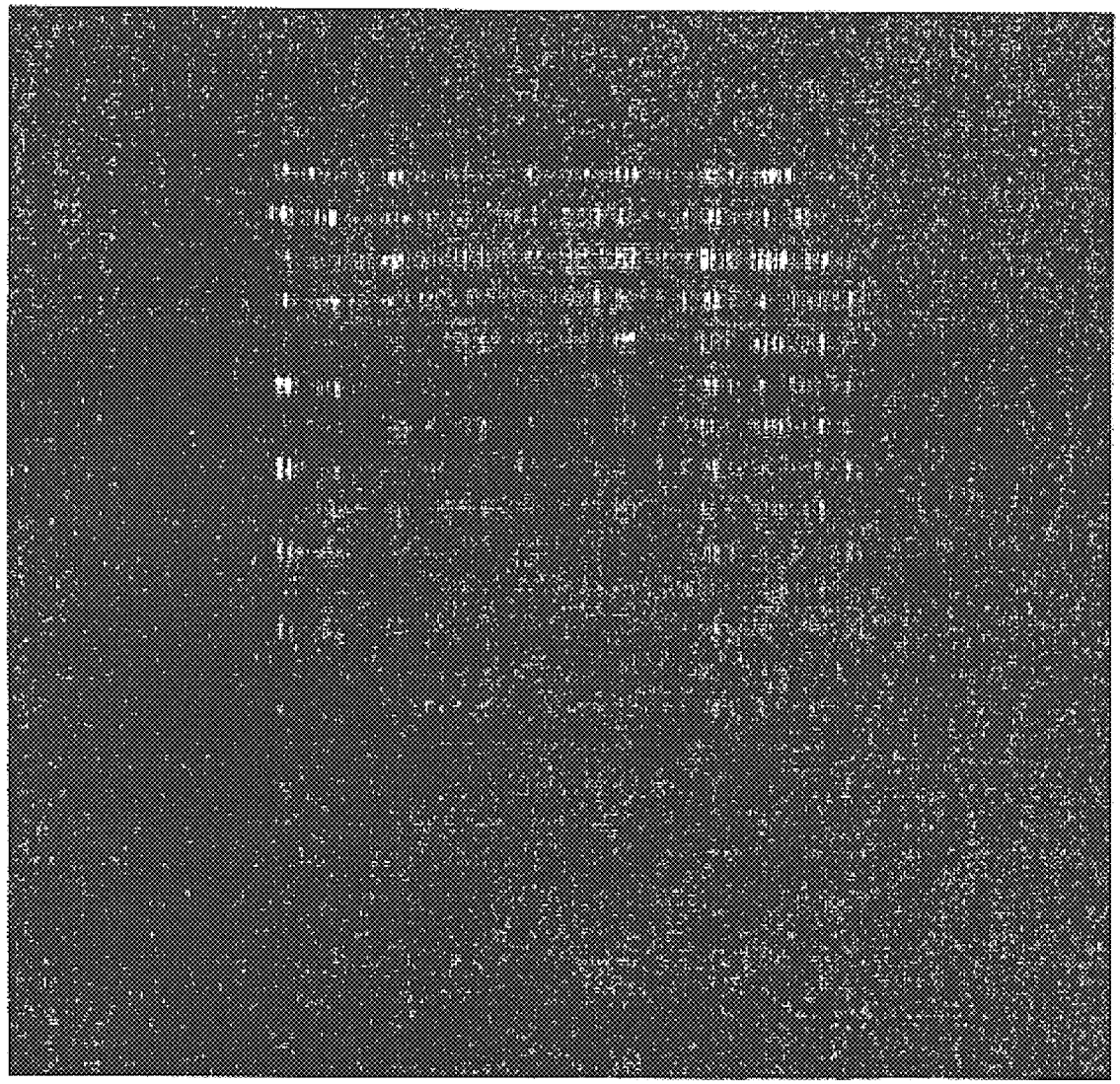
FIG. 9 is a photograph of a fabric at a 90° elevation according to an embodiment of the present invention.

A system for illuminating the fabric is shown in FIG. 3. As can be seen, a glass rod 38 was then attached to the fiber optic fabric 33, and a light engine 39 was connected to the glass rod 38. The glass rod 38, which is known in the art, may be any fiber optic light guide with suitable couplings. The light engine 39, which is known in the art, may be any source of illumination. The fabric was then photographed at various elevations from the plane of the fabric to show the angular intensity distribution. FIGS. 4 through 9 are photographs of the fabric as seen from elevations of 10°, 26°, 42°, 58°, 74°, and 90°, respectively.

As can be appreciated by those skilled in the art, the present invention provides improved fiber optic fabrics and methods for their production. Also provided are fiber optic fabrics having improved directional light emission control. Further, the present invention provides a fabric comprising optical fibers, wherein light leakage is decreased. A fiber optic fabric having improved directional control of light emission without the use of luminaires is also provided. Additionally, a vehicle lighting fabric having improved aerodynamic properties is provided.

It should be understood, of course, that the foregoing relates to preferred embodiments of the invention and that modifications may be made without departing from the spirit and scope of the invention as set forth in the following claims.

We claim:

1. An article of manufacture for emitting a light comprising:
   a plurality of optical fibers that are woven into a fabric;
   an opaque coating applied to said optical fibers and covering said optical fibers in said fabric; and
   a plurality of openings in said opaque coating, wherein said openings emit light transmitted by said optical fibers, said opaque coating prevents leakage of light from said optical fibers elsewhere from said openings, and said openings direct said emitted light at an exit angle in a specific region so that said article provides a directional light emission.

2. The article of claim 1, wherein said opaque coating is applied during the manufacturing of said optical fiber.

3. The article of claim 1, wherein said opaque coating is in contact with said woven fabric.

4. The article of claim 1, wherein said opaque coating is formed from a material selected from the group consisting of epoxy, latex, fluoropolymer and a combination thereof.

5. The article of claim 1, wherein said openings are positioned at the high points of the weave of said fabric.

6. The article of claim 1, wherein the exit angle of said directional light emission is about equivalent to the acceptance angle of said optical fiber.

7. The article of claim 1, further comprising a plurality of non-optical fibers in contact with said optical fibers.

8. The article of claim 7, wherein said optical fibers are in the weft direction.

9. The article of claim 7, wherein said optical fibers are in the warp direction.

10. The article of claim 7, wherein said non-optical fibers are formed from a material selected from the group consisting of fiberglass, poly paraphenyleneterephthalamide, carbon, and cotton.

11. A woven fabric for emitting a light comprising:
    a plurality of optical fibers;
    a plurality of non-optical fibers in contact with said optical fibers;
    an opaque coating applied to said optical fibers and covering said optical fibers in said fabric; and
    a plurality of openings in said opaque coating, wherein said opaque coating emits light transmitted by said optical fibers through said openings, said openings being the only areas through which light is emitted from the optical fibers so that said opaque coating prevents leakage of light from said optical fibers elsewhere from said openings, and said openings direct said emitted light at an exit angle in a specific region so that said fabric provides a directional light emission.

12. The woven fabric of claim 11, wherein said optical fibers are in the weft direction.

13. The woven fabric of claim 11, wherein said optical fibers are in the warp direction.

14. The woven fabric of claim 11, wherein said non-optical fibers are formed from a material selected from the group consisting of fiberglass, poly paraphenyleneterephthalamide, carbon, and cotton.

15. The woven fabric of claim 11, wherein said opaque coating is formed from a material selected from the group consisting of epoxy, latex, fluoropolymer and a combination thereof.

16. The woven fabric of claim 11, wherein said openings are positioned at the high points of the weave of said woven fabric.

17. The woven fabric of claim 11, wherein the exit angle of said directional light emission is about equivalent to the acceptance angle of said optical fiber.

18. An article of manufacture for illuminating an aircraft comprising:
    a plurality of optical fibers that are woven into a fabric;
    an opaque coating applied to said optical fibers and covering said optical fibers in said fabric; and
    a plurality of openings In said opaque coating, wherein:
        said opaque coating emits light transmitted by said optical fibers through said openings;
        said openings are the only areas through which light is emitted from the optical fibers;
        said opaque coating Prevents leakage of light from said optical fibers elsewhere from said openings; and
        said openings direct said emitted light in a specific region so that said article provides a directional light emission.

19. The article of claim 18, wherein the exit angle of said directional light emission is about equivalent to the acceptance angle of said optical fiber.

20. The article of claim 18, further comprising a plurality of non-optical fibers in contact with said optical fibers.

21. The article of claim 18, wherein said article provides aircraft lighting selected from the group consisting of formation lighting and anti-collision lighting.

22. The article of claim 18, wherein said article provides position lighting for said aircraft.

23. The article of claim 18, wherein said opaque coating is formed from a material selected from the group consisting of epoxy, latex, fluoropolymer and a combination thereof.

24. The article of claim 18, further comprising a cover material in contact with a surface of said woven fabric.

25. The article of claim 18, further comprising a substructure in contact with a surface of said woven fabric.

26. An article of manufacture for emitting a light comprising:
    a plurality of optical fibers;
    a plurality of non-optical fibers formed of a material selected from the group consisting of fiberglass, poly paraphenyleneterephthalamide, carbon, and cotton, said non-optical fibers in contact with said optical fibers and forming a woven fabric;
    an opaque coating applied to said woven fabric and covering said optical fibers in said fabric, said opaque coating formed from a material selected from the group consisting of epoxy, latex, fluoropolymer and a combination thereof; and
    a plurality of openings in said opaque coating, said openings positioned at the high points of the weave of said woven fabric, wherein
        said opaque coating emits light transmitted by said optical fibers through said openings;

said openings are the only areas through which light is emitted from the optical fibers;

said opaque coating prevents leakage of light from said optical fibers elsewhere from said openings;

said openings limit the direction of the emitted light to the direction of travel of the light transmitted by said optical fibers upon reaching the opening so that said openings direct said emitted light at an exit angle wherein said exit angle equals an acceptance angle of the optical fibers; and said article provides a directional light emission.

27. A method for producing an article of manufacture for emitting a light, comprising the steps of:

providing a plurality of optical fibers that are woven into a fabric;

applying an opaque coating to said optical fibers and covering said optical fibers in said fabric; and removing a portion of said opaque coating to form a plurality of openings in said opaque coating, wherein said openings emit light transmitted by said optical fibers;

said opaque coating prevents leakage of light from said optical fibers elsewhere from said openings; and said openings direct said emitted light at an exit angle in a specific region so that said article provides a directional light emission.

28. The method of claim 27, wherein said opaque coating is applied during the manufacturing of said optical fiber.

29. The method of claim 27, wherein said opaque coating is in contact with said woven fabric.

30. The article of claim 27, wherein said opaque coating is formed from a material selected from the group consisting of epoxy, latex, fluoropolymer and a combination thereof.

31. The article of claim 27, wherein said openings are positioned at the high points of the weave of said fabric.

32. The article of claim 27, wherein the exit angle of said directional light emission is about equivalent to the acceptance angle of said optical fiber.

33. The method of claim 27, further comprising a step of providing a plurality of non-optical fibers in contact with said optical fibers.

34. The article of claim 33, wherein said optical fibers are in the weft direction.

35. The article of claim 33, wherein said optical fibers are in the warp direction.

36. The article of claim 33, wherein said non-optical fibers are formed from a material selected from the group consisting of fiberglass, poly paraphenyleneterephthalamide, carbon, and cotton.

* * * * *